July 6, 1954

A. G. BALLARD 2,682,973

MACHINE FOR DELIVERING PREDETERMINED QUANTITIES OF
SCREWS OR OTHER HEADED ROD-LIKE ARTICLES

Filed Dec. 3, 1952

INVENTOR
Alfred George Ballard

BY
Richardson, David and Nordon
his AGENTS

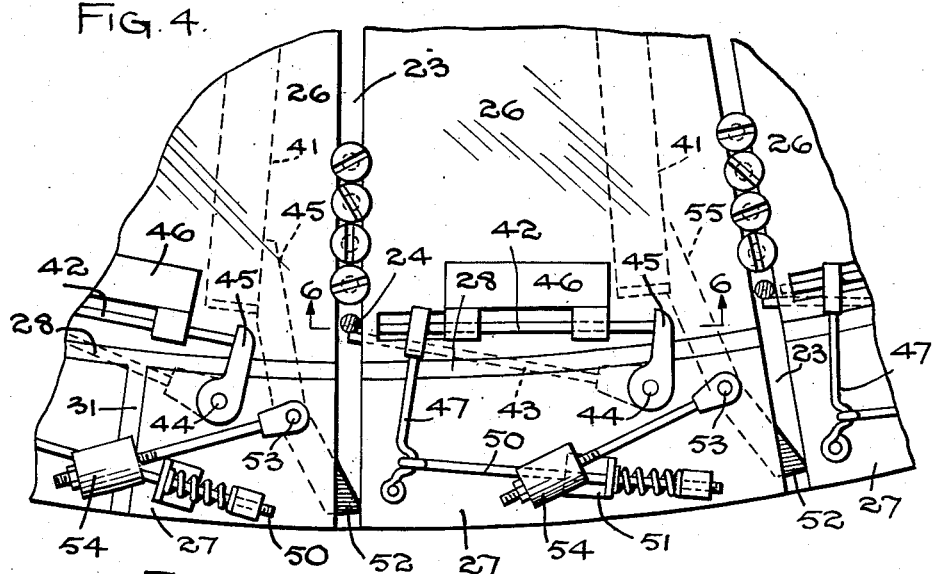
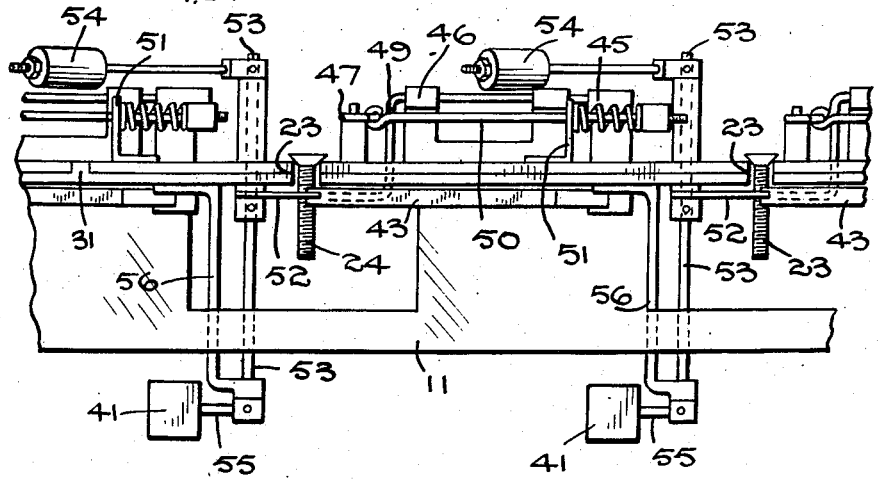
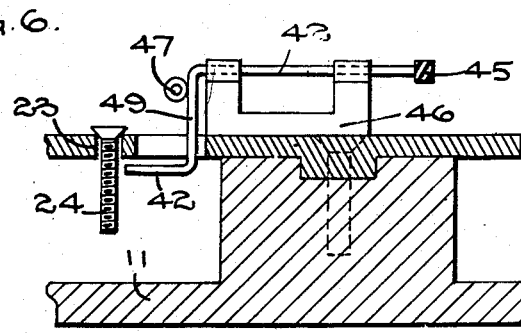

Patented July 6, 1954

2,682,973

UNITED STATES PATENT OFFICE 2,682,973

MACHINE FOR DELIVERING PREDETERMINED QUANTITIES OF SCREWS OR OTHER HEADED ROD-LIKE ARTICLES

Alfred George Ballard, Birmingham, England, assignor to G. K. N. Group Services Limited, Smethwick, England, a British company Application December 3, 1952, Serial No. 323,896

12 Claims. (Cl. 221—68)

This invention relates to a new or improved machine for delivering predetermined numerical quantities of articles, and the invention is particularly applicable to such delivery of screws or like articles each having a head and a shank.

The object of the present invention is to provide a machine wherein predetermined numerical quantities of articles can be separated from a bulk supply ready for packing into containers.

Another object of the invention is to provide a machine for continuous operation and continuous delivery of predetermined numerical quantities of articles.

A more specific object of the invention is the provision of a machine for continuous automatic delivery of predetermined numerical quantities of screws and other similar articles having a shank and a head.

A machine constructed in accordance with the present invention comprises a feeder member for receiving a supply of the articles, the feeder member having a number of elongated slots, propulsive means for causing the shank articles to pass into the slots so that the articles are positioned in the slots for moving along the slots towards the outer ends thereof, separating means associated with the outer end portion of each slot to separate the article nearest the outer end of the slot from the other articles in the same slot and to arrest said other articles while permitting the article so separated to continue its movement along the slot, a movable gate member at or near the outer end of each slot to arrest the movement of the separated article till said movable gate member is opened, opening means for simultaneously opening all the gate members, said opening means being inoperative until the outer ends of all the slots contain an article whereupon the conditions necessary for the operation of said opening means are established so that the gate members are automatically and simultaneously opened to allow an article to be discharged from each slot.

Conveniently, a rotary feeder is employed so that centrifugal force will cause the articles to move outwards along radially arranged slots and electrical means is used for opening the gate members. With this arrangement the preferred form of the machine for delivering predetermined numerical quantities of screws or similar articles having a head and a shank comprises a rotary feeder member for receiving a supply of the articles, the feeder member having a number of radial or approximately radial slots of a width less than the width of the heads of the articles, these slots being provided in the base of the rotary feeder member and the latter having propulsive means to cause the shanks of the articles to pass into the slots so that the articles are suspended in the slots by their heads, centrifugal force causing the articles in each slot to move towards the outer end of the slot.

The electrical circuit may be completed by the said separated outermost article in each slot, either by bridging across opposite sides of the slot or by making contact with the gate. The outer portions of the walls of the slots are electrically insulated from the inner portions of the walls of the slots, and all the articles in the slots except the said separated one are retained in the inner portions of the slots by the separating means.

The articles received by the rotary feeder may be agitated by one or more wiper blades, which may be formed of semi-flexible material and may be arranged approximately radially, relative rotary movement being provided between such blade or blades and the base of the rotary feeder, i. e. the blade or blades may rotate in the same direction as the rotary feeder but at a greater or less speed.

The operating mechanism for the gates may incorporate a spider mounted concentrically with the rotary feeder, the arms of this spider mechanically engaging the gates, or means associated therewith, mounted on the feeder when relative angular movement around the axis of the feeder and between the spider and the feeder is produced as the result of the completion of the electrical circuit. The movement may be produced by means of an electromagnet.

The base of the rotary feeder is preferably horizontal, and the slots therein may be formed between sector-like plates which may be mounted so that they are adjustable radially to vary the width of the slots as may be required for dealing with articles of various sizes.

One form of the invention is illustrated in the accompanying drawings wherein:

Figure 4 is an enlarged plan view of part of the rotary feeder.

Figure 5 is a side view of the part shown in Figure 4.

Figure 6 is a section on the line 6—6 in Figure 4.

Figure 1:
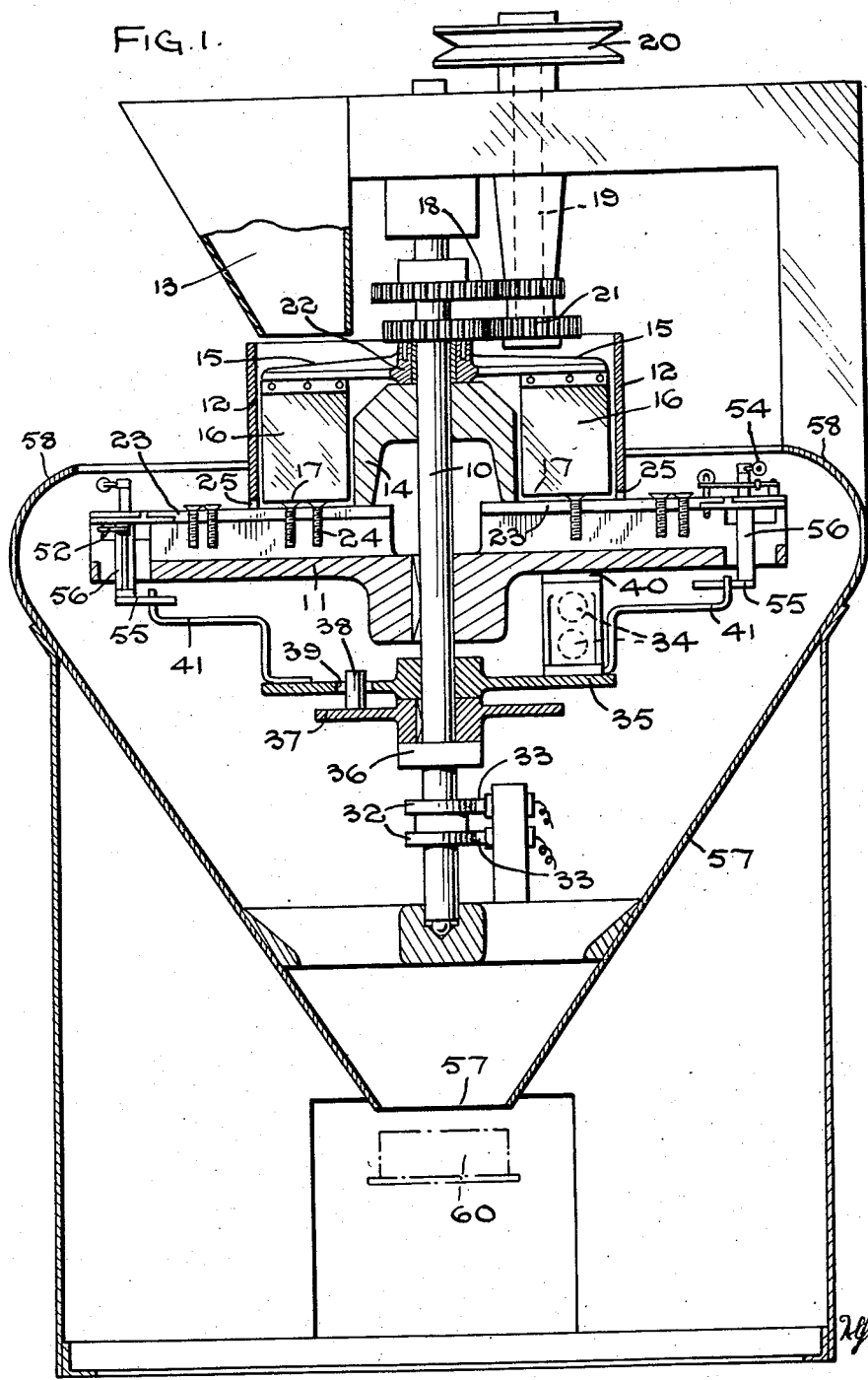
Figure 1 is a vertical section through the machine.
Figure 2:
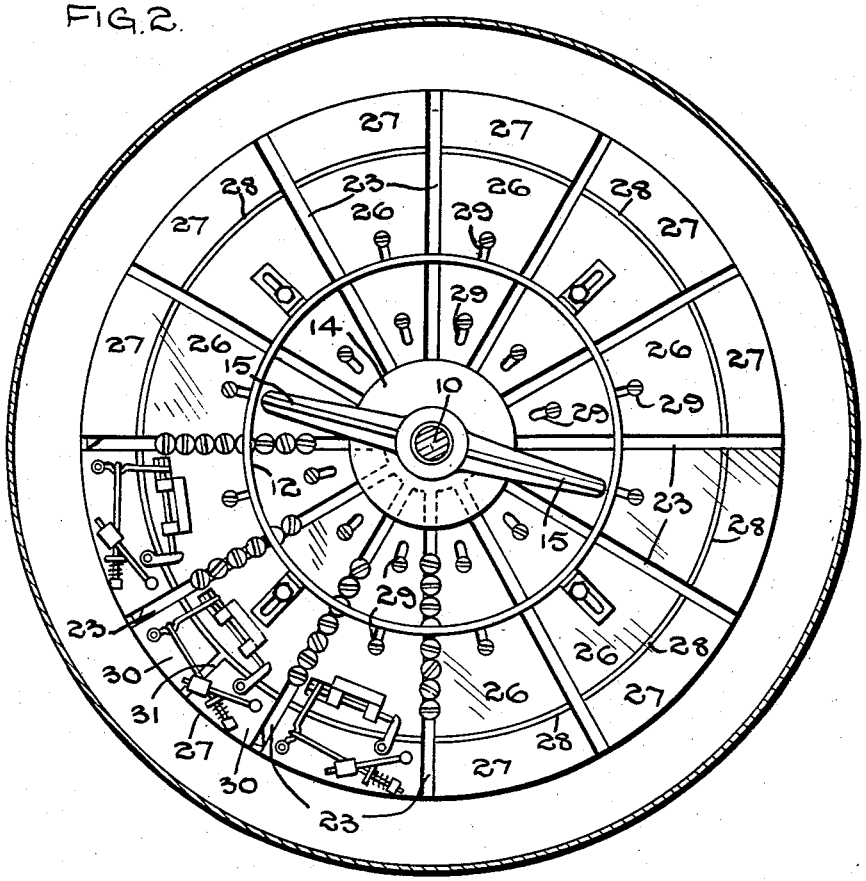
Figure 2 is a plan view of the rotary feeder and wiper blades.
Figure 3:
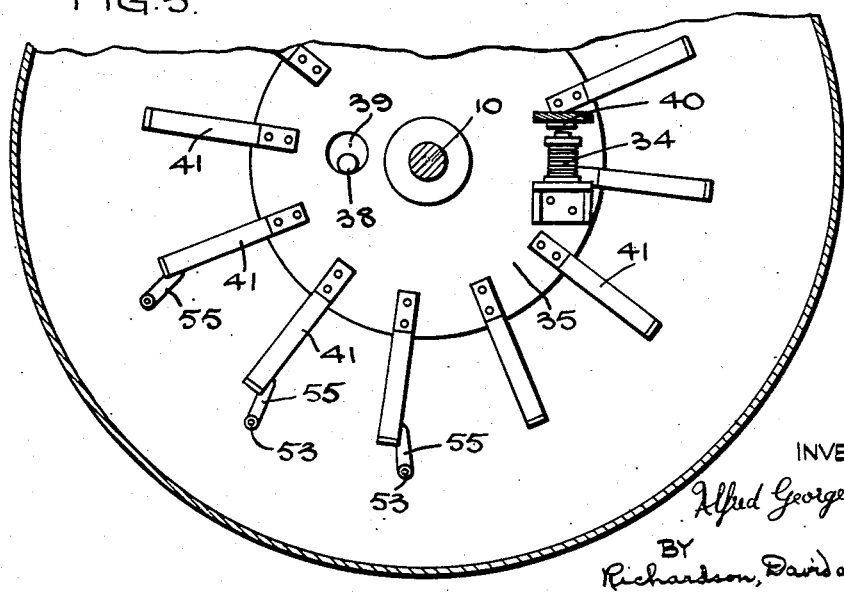
Figure 3 is a plan view of the spider below the rotary feeder.

In the construction shown in the drawings the rotary feeder is mounted on a vertical shaft 10, the base 11 of the feeder being flat and horizontal. The feeder comprises a cylindrical wall 12, and the articles are fed into it from the chute 13 by an oscillating or vibratory feeder. The articles are fed into an annular space between the outer wall 12 and an inner wall 14, which is also of cylindrical form at its lower part and of truncated conical form at its upper part and is secured to said rotary feeder.

Mounted concentrically with the shaft 10 and above the base 11 of the feeder is a spider 15, which has two arms, and fixed to the arms of this spider are wiper blades 16, which may be made of semi-flexible material, such as leather. These wiper blades 16 are of a width slightly less than the width of the annular space between the inner and outer walls 14 and 12, and their lower edges 17 are horizontal and disposed near to the upper surface of the base 11 of the feeder.

Rotary motion is imparted to the feeder by the shaft 10, which is driven through gearing 18 by shaft 19 provided with a pulley 20 whereby it may be driven by a belt, and rotary motion at a somewhat higher (or somewhat lower) speed is imparted to the spider 15 carrying the wiper blades 16 through gearing 21 from the shaft 19 to a sleeve 22 mounted concentrically about the shaft 10 and fixed to the spider 15.

The base 11 of the feeder has on its upper side a suitable number of sector-like plates (12 being shown here) between the edges of which radial slots 23 are formed into which the shanks 24 of the articles are moved by the wiper blades 16 so that the articles are suspended by their heads which engage adjacent plates at opposite sides of the slot 23. Owing to the rotary motion imparted to the feeder the articles are moved in a row outwardly by centrifugal force and the row moves towards the outer ends of the slot 23.

The base 11 of the feeder extends beyond the outer wall 12 thereof, and adjacent each slot 23 openings 25 are provided in the outer wall 12 so that the heads of the articles can pass therethrough.

Each of the sector-like plates is made in two parts, an inner part 26 and an outer part 27, these two parts being electrically insulated from each other at 28, and the plates are mounted upon and insulated from the base 11 of the rotary feeder, which base forms a turntable fixed to the shaft 10.

The sector-like plates are mounted by means of screws passing through slots 29 in the plates so that they can be adjusted towards or away from the centre of rotation so as to suit articles of various sizes of shank. The outer wall 12 is mounted on the plate 26 of screws which pass through slots in brackets 29a, attached to the wall 12, so as to permit the plates 26 to be adjusted radially relatively to the wall 12.

Further the outer portion 27 of one of the sector-like plates is further divided into two parts 30, the division being approximately radial, and these two parts being electrically insulated from each other by a radial member of insulating material 31.

Electric conductors are connected to these two parts 30 and taken to slip rings 32 which are mounted on the shaft 10 and current-collecting brushes 33 are provided, one for each slip ring, and the windings of an electromagnet 34 are included in series with this circuit. This electromagnet 34 is mounted on a spider 35 which is concentric with the shaft 10 and is free to rotate about shaft 10 and is driven by a disc 37 having a driving peg 38 engaging a clearance hole 39 in the spider 35, said disc 37 being located by a collar 36 on the shaft 10 and being also keyed to the shaft 10. The armature 40 of the electromagnet 34 secured to the spider 35, is carried by the base 11 of the rotary feeder. Thus spider 35 is capable of limited angular movement relative to the base 11 around the shaft 10, and this movement takes place when the electric circuit is completed and electromagnet 34 is consequently energised so that it moves into contact with its armature 40, causing the arms 41 secured to the spider to engage arms 55 and so open the gates 52 which control the outlets at the outer ends of the slots 23.

Adjacent the outer end of each slot 23 a separator is provided for arresting the outward movement of all the articles except that nearest the end of the slot.

This separation comprises a slide 42 which is adapted to be moved across, or partially, across the slot 23 to form a barrier which prevents further progress of articles along the slot. The movement of slide 42 is controlled by an operating lever 43 which is formed as a bell crank lever, pivoted at 44 and having its one arm projecting into the slot 23 whilst its other arm 45 engages the end of the slide 42.

The separator slide 42 is guided in a bearing 46, and it is spring-loaded in a direction to bring the slide out of the slot 23. This is done by providing a loading lever 47 for the separator slide. This lever 47 is pivoted at 48 in a suitable position near the discharge end of the slot 23 and is disposed transversely to the separator slide and acts upon a cranked part 49 of the slide 42. The loading lever 47 is engaged by a spring-pressed sliding pin 50 mounted in a suitable guide 51. This mechanism is provided on all the slots although only shown on three in the drawings.

The operation of the separation slide is as follows:

Referring to Figure 4, when the leading article 24 engages the lever 43 it moves it outwardly to cause it to pivot about the axis 44 and thus move the slide 42 across the slot 43, thereby arresting the movement of the next article in the slot. The movement of the slide 42 into and across the slot 23 takes place while the article 24 is moving from the position shown in Figure 4 out along the slot until it comes to the gate 52. Until the gate 52 opens, the article cannot be released and thus the lever 43 cannot return to its initial position because the article is still bearing on lever 23. When the gate 52 opens and the article is discharged the lever 43 is returned, due to the spring pressure acting on the slide 42, and the next article in the slot is free to engage lever 43 and repeat the operation.

When the leading article moves towards the end of the slot 23 its head forms an electrical connection between the plates 27 on either side of the slot, but the electric circuit is not completed until there is an article in the outer part of all the slots. When this condition occurs the electric circuit is completed and the movable gates 52 at the outer ends of the slots 23 are opened by the means already described.

These movable gates 52 are each pivoted on a vertical axis 53, and each comprises an arm 52 which is disposed transversely to the slot 23, and an arm 55 which is engaged by the spider arms 41 to open the gate and the gate is weighted by weights 54 so that centrifugal force moves a gate into a position in which it occupies an inclined position across the slot near the end thereof. A stop may be provided to limit this motion, and when the outermost article is moving along the outer portion of the slot its motion is arrested by the surface of the gate which is inclined to the slot. The pivotal axis 53 comprises a spindle mounted in a guide bracket 56.

Instead of using the outer portions of the sector-like plates as parts of the electric circuit, the gates of their spindles may be insulated from the sector-like plates and the electric circuit may be completed when there are articles in the outer portions of all the slots in contact with the gates. When all these contacts have been made a switch may be operated to complete the electric circuit, and thus automatically open all the gates.

In the machine described a known number of the articles are discharged at each delivery from the periphery of the rotating feeder, and these articles fall into a hollow body 57 surrounding the feeder, this body being of approximately conical form with the upper portion 58 of its sides directed inwardly. Thus, each delivery of articles will fall to the bottom of the cone where there is an opening 59 into a container 60, which may be placed on a conveyor.

I claim:

1. A machine for delivering predetermined numerical quantities of metal articles comprising, a feeder member for receiving a supply of the articles, said feeder member having a number of elongated slots propulsive means for causing the articles to pass into the slots so that the articles are positioned in the slots for moving along the slots towards the outer ends thereof, separating means associated with the outer end portion of each slot to separate the article nearest the outer end of the slot from the other articles in the same slot and to arrest said other articles while permitting the article so separated to continue its movement along the slot, a movable gate member at the outer end of each slot to arrest the movement of the separated article till said movable gate member is opened electrically operated, opening means for simultaneously opening all the gate members, and circuit completing means situated at the outer end portion of each slot forming part of the electrical circuit to said opening means, said circuit completing means being electrically insulated from at least the portions of the slots inwards of the separating means and the circuit being completed when said circuit completing means are engaged by an article in the outer ends of all the slots, whereupon said opening means is operated so that the gate members are automatically and simultaneously opened to allow an article to be discharged from each slot.

2. A machine for delivering predetermined numerical quantities of screws or metal similar articles each having a head and a shank, comprising, a rotary feeder member for receiving a supply of the articles, said feeder member having a number of radial slots each of a width less than the width of the head of an article propulsive means associated with the rotary feeder member to cause the shanks of the articles to pass into the slots at or near the inner ends thereof so that the articles are suspended in the slots by their heads, means for rotating said feeder member, to cause the articles to move outwardly along the slots towards the outer end thereof, separating means, disposed at the outer end portion of each slot to separate the article nearest the outer end of the slot from the other articles in the same slot and to arrest said other articles while permitting the article so separated to continue its outward movement, a movable gate at the outer end of each slot to arrest the outward movement of said separated article until the gate is opened, electrically operated opening means for simultaneously opening all the gates, and circuit completing means situated at the outer end portion of each slot forming part of the electrical circuit to said opening means, said circuit completing means being electrically insulated from at least the portions of the slots inwards of the separating means and the circuit being completed when said circuit completing means are engaged by an article in the outer ends of all the slots, whereupon said opening means is operated to open the gates and allow an article to be discharged from each slot.

3. A machine according to claim 2 wherein the said circuit completing means is formed by the outer end portion of the slots beyond the separating means and the electrical circuit of said electrically operated opening means is completed by the said separated article in each slot forming the electrical connection between opposite sides of the slot.

4. A machine according to claim 2 where the said circuit completing means is formed by the gates at the outer ends of the slots and the electrical circuit of said electrically operated opening means is completed by the said separated article in each slot making contact with the gate.

5. A machine according to claim 2 wherein the movable gate, for each slot, comprises a lever, pivoted intermediate its ends on the rotary feeder and weight loaded so that centrifugal force tends to keep the gate closed.

6. A machine according to claim 2 wherein the articles are fed to the rotary feeder into the annular space between two spaced concentric walls, the machine being surrounded by a hollow body of conical form into which the articles are discharged from the rotary feeder.

7. A machine for delivering predetermined numerical quantities of screws or similar metal articles each having a head and a shank, comprising, a rotary feeder member for receiving a supply of the articles, said feeder member having a number of radial slots each of a width less than the width of the head of an article, at least one wiper blade of semi-flexible material arranged radially in relation to the rotary feeder member, means for rotating said blade or blades about the axis of rotation of the feeder member in the same direction but at a different speed to cause the shanks of the articles to pass into the slots at or near the inner ends thereof so that the articles are suspended in the slots by their heads, means for rotating said feeder member, to cause the articles to move outwardly along the slots towards the outer end thereof, separating means, disposed at the outer end portion of each slot to separate the article nearest the outer end of the slot from the other articles in the same slot and to arrest said other articles while permitting the article so separated to continue its outward movement, a movable gate at the outer end of each slot to arrest the outward movement of said separated article until the gate is opened, electrically operated opening means for simultaneously opening all the gates, and circuit completing means situated at the outer end portion of each slot forming part of the electrical circuit to said opening means, said circuit completing means being electrically insulated from at least the portions of the slots inwards of the separating means and the circuit being completed when said circuit completing means are engaged by an article in the outer ends of all the slots, whereupon said opening means is operated to open the gates and allow an article to be discharged from each slot.

8. A machine for delivering predetermined numerical quantities of screws or similar metal articles each having a head and a shank, comprising a rotary feeder member for receiving a supply of the articles, said feeder member having a number of radial slots each of a width less than the width of the head of an article, propulsive means associated with the rotary feeder member to cause the shanks of the articles to pass into the slots at or near the inner ends thereof so that the articles are suspended in the slots by their heads, means for rotating said feeder member, to cause the articles to move outwardly along the slots towards the outer end thereof, separating means, disposed at the outer end portion of each slot to separate the article nearest the outer end of the slot from the other articles in the same slot and to arrest said other articles while permitting the article so separated to continue its outward movement, a movable gate at the outer end of each slot to arrest the outward movement of said separated article until the gate is opened, electrically operated opening means for simultaneously opening all the gates, and circuit completing means situated at the outer end portion of each slot forming part of the electrical circuit to said opening means, said electrically operated opening means including, a spider having radially projecting arms mounted concentrically with the rotary feed for rotation therewith and being capable of limited angular movement relative to said feeder, and circuit completing means situated at the outer end portion of each slot forming part of the electrical circuit to said opening means, said circuit completing means being electrically insulated from at least the portions of the slots inwards of the separating means and the circuit being completed when said circuit completing means are engaged by an article in the outer ends of all the slots, whereupon said opening means is operated to produce relative angular movement between said spider and the rotary feeder to cause the arms of the spider to have mechanical engagement with the gates to open the gates and allow an article to be discharged from each slot.

9. A machine according to claim 8 wherein the relative angular movement between the rotary feeder and the spider is produced by means of the attraction between an electromagnet and its armature, one being mounted on the spider and the other being mounted on the base of the rotary feeder, and being connected in said electrical circuit.

10. A machine for delivering predetermined numerical quantities of screws or metal similar articles each having a head and a shank, comprising, a rotary feeder member for receiving a supply of the articles, said feeder member having a number of radial slots each of a width less than the width of the head of an article, said slots being formed between the spaced edges of a plurality of sector shaped plates, said plates being mounted on the base of the feeder for radial adjustment to vary the width of the slots, propulsive means associated with the rotary feeder member to cause the shanks of the articles to pass into the slots at or near the inner ends thereof so that the articles are suspended in the slots by their heads, means for rotating said feeder member, to cause the articles to move outwardly along the slots towards the outer end thereof, separating means, disposed at the outer end portion of each slot to separate the article nearest the outer end of the slot from the other articles in the same slot and to arrest said other articles while permitting the article so separated to continue its outward movement, a movable gate at the outer end of each slot to arrest the outward movement of said separated article until the gate is opened, electrically operated opening means for simultaneously opening all the gates, and circuit completing means situated at the outer end portion of each slot forming part of the electrical circuit to said opening means, said circuit completing means being electrically insulated from at least the portions of the slots inwards of the separating means and the circuit being completed when said circuit completing means are engaged by an article in the outer ends of all the slots, the electrical circuit of said electrically operated means being completed when the outer ends of all the slots each contain an article whereupon said opening means is operated to open the gates and allow an article to be discharged from each slot.

11. A machine according to claim 10 wherein the plates are each formed in two parts, an inner part and an outer part which are electrically insulated from each other and the separating means are adapted to retain all the articles except the said separated one in each slot, so that the articles remain within the portions of the slots formed by the inner parts of the plates.

12. A machine for delivering predetermined numerical quantities of screws or similar metal articles each having a head and a shank, comprising, a rotary feeder member for receiving a supply of the articles, said feeder member having a number of radial slots each of a width less than the width of the head of an article, propulsive means associated with the rotary feeder member to cause the shanks of the articles to pass into the slots at or near the inner ends thereof so that the articles are suspended in the slots by their heads, means for rotating said feeder member, to cause the articles to move outwardly along the slots towards the outer end thereof, separating means disposed at the outer end portion of each slot to separate the article nearest the outer end of the slot from the other articles in the same slot and to arrest said other articles while permitting the article so separated to continue its outward movement, said separating means comprising a slide adapted to project into the slot, spring means acting on said slide tending to withdraw it from the slot, and a pivotally mounted operating lever having part projecting into said slot and part engaging said slide so as to move said slide into the slot when the operating lever is moved by an article moving along the slot, a movable gate at the outer end of each slot to arrest the outward movement of said separated article until the gate is opened, electrically operated opening means for simultaneously opening all the gates, and circuit completing means situated at the outer end portion of each slot forming part of the electrical circuit to said opening means, said circuit completing means being electrically insulated from at least the portions of the slots inwards of the separating means and the circuit being completed when said circuit completing means are engaged by an article in the outer ends of all the slots, whereupon said opening means is operated to open the gates and allow an article to be discharged from each slot.

References Cited in the file of this patent

UNITED STATES PATENTS

| Number | Name | Date |
|--------|------|------|
| 335,212 | Brosnan | Feb. 2, 1886 |